United States Patent
Okada et al.

(10) Patent No.: US 8,130,824 B2
(45) Date of Patent: *Mar. 6, 2012

(54) METHOD AND APPARATUS FOR PROCESSING IMAGES, METHOD AND APPARATUS FOR RECORDING AND REPRODUCING IMAGES, AND TELEVISION RECEIVER UTILIZING THE SAME

(75) Inventors: Shinichiro Okada, Toyohashi (JP); Shigeyuki Okada, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 346 days.

This patent is subject to a terminal disclaimer.

(21) Appl. No.: 12/480,207

(22) Filed: Jun. 8, 2009

(65) Prior Publication Data

US 2009/0256964 A1    Oct. 15, 2009

Related U.S. Application Data

(62) Division of application No. 10/456,847, filed on Jun. 9, 2003, now Pat. No. 7,558,318.

(30) Foreign Application Priority Data

Jun. 11, 2002  (JP) .................................. 2002-170712

(51) Int. Cl.
  *H04B 1/66* (2006.01)
(52) U.S. Cl. ......... 375/240.01; 375/240.25; 375/240.26; 348/14.07; 348/564; 348/588; 348/576; 348/559; 348/563; 348/578; 382/298; 382/295; 382/282

(58) Field of Classification Search .............. 375/240.01, 375/240.25, 240.26; 348/14.07, 564, 576, 348/588, 559, 563, 578; 382/298, 295, 282
See application file for complete search history.

(56) References Cited

U.S. PATENT DOCUMENTS

| 6,778,223 B2 * | 8/2004 | Abe .............................. 348/559 |
| 7,558,318 B2 * | 7/2009 | Okada et al. ............. 375/240.01 |

FOREIGN PATENT DOCUMENTS

| JP | 03-055985 A | 3/1991 |
| JP | 3058333 B2 | 4/2000 |
| JP | 2000-308003 A | 11/2000 |
| JP | 2001-157176 | 6/2001 |
| JP | P2001-177804 A | 6/2001 |

OTHER PUBLICATIONS

Japanese Office Action for Corresponding Japanese Patent Application No. JP 2003-160351, Dispatched, Jan. 31, 2006.
Japanese Office Action issued for corresponding Japanese Patent Application No. 2003-160351, dated Jun. 20, 2006.
Chinese Office Action, w/ English translation thereof, issued in Chinese Patent Application No. 03149350.5 dated on Sep. 5, 2008.

* cited by examiner

*Primary Examiner* — Shawn An
(74) *Attorney, Agent, or Firm* — McDermott Will & Emery LLP

(57) ABSTRACT

The moving images under reproduction are displayed in a main screen and a plurality of thumbnail images that serve as indexes by which to search for a desired scene are displayed. Moreover, the thus displayed thumbnail images are updated at a predetermined timing according as the moving images progress.

4 Claims, 11 Drawing Sheets

METHOD AND APPARATUS FOR PROCESSING IMAGES, METHOD AND APPARATUS FOR RECORDING AND REPRODUCING IMAGES, AND TELEVISION RECEIVER UTILIZING THE SAME

RELATED APPLICATIONS

This application is a Divisional of U.S. application Ser. No. 10/456,847, filed Jun. 9, 2003, now U.S. Pat. No. 7,558,318, claiming priority of Japanese Application No. 2002-170712, filed Jun. 11, 2002, the entire contents of each of which are hereby incorporated by reference.

BACKGROUND OF THE INVENTION

1. Field of the Invention

The present invention relates to a technology for recording and reproducing images, and it particularly relates to a technique which supports the search of a desired scene while viewing moving images.

2. Description of the Related Art

A method of recording moving images used increasingly in recent years is one using such recording medium as DVD (Digital Versatile Disc) or hard disk magnetic recording medium (hereinafter referred to simply as "hard disk" also), which facilitates random access to recorded data. Helped by the growing capacity of hard disks and the lowered price thereof, hard disk recorders, which are image recording/reproducing apparatus using hard disks, are now commercially available on the market. There are even cases where a hard disk recorder is built into a television receiver.

Such hard disk recorders, when using a hard disk with a recording capacity of about 80 GB, which can be obtained with relative ease today, can perform about 30 hours of recording with image quality equivalent to a common VTR. They can even accomplish close to 100 hours of recording if priority is given to the length of recording over image quality.

For an image recording/reproducing apparatus using a recording medium that facilitates random access to recorded data as mentioned above, there is a method using thumbnail images as a technology by which to search for a desired scene among the recorded moving images. In this technique, still images are selected in advance from moving images, and are reduced to a predetermined size so as to be displayed in the form of indexes. Even if the desired scene is searched by employing this scheme, it often takes much time until the desired scene are finally searched. Moreover, in order to search the desired scene it is necessary to interrupt once the reproduction of the moving images and then call an index display screen.

SUMMARY OF THE INVENTION

In the foregoing circumstances, the inventors of the present invention came to recognize the following points. Namely, if the search of the desired scene is easier, the usability on users' part will be improved. Moreover, if the desired scene is very near the presently displayed scene and the desired scene can be searched without taking the trouble to interrupt the reproduction of the moving images, the desired scene can be displayed instantly and the search becomes easier so as to minimize the amount of operation by the user. Moreover, if a scene to be searched is near the presently displayed scene in time, there are cases where it is not necessary to interrupt the reproduction of the moving images.

The present invention has been made based on such knowledge and recognition and an object thereof is to provide a technique which supports the search of a desired scene while viewing moving images.

A preferred embodiment according to the present invention relates to an image processing method. This method includes: controlling to cause to display, at the time when moving images are displayed, a plurality of reduced images in a manner such that a temporal relation of the reduced images to progression of the moving images is recognizable; and updating the displayed reduced images according to the progression of the moving images.

Here, the reduced image is an image where the size of a unit image constituting the moving images is reduced, and a method of generating the reduced images and a mode of reduction may b arbitrary. For example, the reduction may be done in a manner that the vertical length and the horizontal length of an image are reduced in the same ratio. Moreover, part of the image may be used.

Moreover, the reduced images to be displayed may be a single reduced image or a plurality of reduced images. Moreover, the reduced image or images to be displayed may be an image or images corresponding to a scene after or before the presently displayed scene, or combination thereof. Moreover, the reduced image or images may be so controlled that they are displayed on the same screen as the moving images, or may be controlled that the reduced images or images alone may be caused to be displayed on a screen.

When a plurality of reduced images are controlled to cause to be displayed, the intervals for those may be arbitrary. In other words, for example, they may be equal intervals in time, or the intervals may be increased as the images are temporally far from the presently displayed scene.

The viewer of moving images can search for a desired scene based on this reduced image, without interrupting the display of the present moving images. If the scene to be searched is located very close to the presently displayed scene, the display need not be interrupted. According to the present invention, such an operation of taking trouble to interruption the display can be avoided.

Another preferred embodiment according to the present invention relates to an image processing apparatus. This apparatus includes: a display controller which controls to cause to display, at the time of displaying moving images, a plurality of reduced images on a same screen displaying the moving images, in a manner such that a temporal relation of the reduced images to progression of the moving images is recognizable; and a reduced-image updating unit which controls to cause to update the displayed reduced images according to the progression of the moving images.

Still another preferred embodiment according to the present invention relates also to apparatus for recoding and reproducing images. This apparatus includes: an image extracting unit which acquires moving image signals and extracts unit images that constitute the moving images; an image selector which selects an original image of an index image used in the search of a desired scene among the moving images, from the unit images extracted by the image extracting unit; a first data recorder which stores the moving images; an index image generator which generates the index image by reducing the size of the selected original image; a second data recorder which records and stores the index image in a manner such that the index image is associated with the original image; an index image specifying unit which selects a predetermined index image from said second data recorder, according to progression of the moving images; and an index updating unit which controls to cause to update the index image according to progression of the moving images.

As the first and second data recorders, there are optical disk recording media, such as DVD, and hard-disks and so forth. Moreover, the index image utilized for the search may also be called a thumbnail image.

The following (1) to (8) are some examples of timing for generating the index images. Namely, the index images may be generated at timing:

(1) of predetermined time intervals;
(2) based on a user's instruction;
(3) of a scene change in the moving images;
(4) of switching from a commercial message to a program;
(5) of a change of a display format;
(6) of index image acquisition points indicated by a creator of moving images;
(7) coupled with the top image of a chapter or an index image of the chapter if moving images are constituted by a plurality of chapters;
(8) of a change point of sound volume, for example, of a point where the sound volume changes greatly and abruptly; and so forth.

In the cases of above (1) to (3), the index images may be generated except for the scene of a commercial message. As an example of the change of the display format, there is a change from the 480i format which is of effective pixels 720×480 and of an interlace frame, to the 720p format which is of effective pixels 1280×720 and of a progressive frame. Said image selector may set the predetermined time intervals in accordance with a state prior to extraction of the original image of the index image. "A state prior to extraction of the original image of the index image" is, for instance, a recording time period for one recording instance, the kind of a program to be recorded, the remaining storage capacity, or a user's instruction when he or she reserves a recording.

Here, the index images may be generated while moving images that have been already recorded are being reproduced, or may be generated at the same time when moving images are recorded anew.

As the update timing of the index image, there is a case where a scene of the displayed moving images is close to any of the index images or a case where the scene matches any of the index images. "A temporal relation of the reduced images to progression of the moving images" means, for example, a case where the index images are arranged in sequence starting from the temporally most rear one (the most recent one) in a manner such that a relation of temporal positions between the reduced image and the moving images can be grasped. For instance, the moving images is displayed in ⅔ left of area of a display unit while the total of four index images of each two being after and the other two being before the presently displayed image are arranged in time series so that the upper-side reduced images thereof corresponds to the traveling direction of the moving images.

Still another preferred embodiment according to the present invention relates also to apparatus for recoding and reproducing images. This apparatus includes: a first decoder which acquires coded data and decodes unit images that constitute moving images; an image selector which selects an original image of an index image used in the search of a desired scene among the moving images, from the unit images decoded by the first decoder; a first data recorder which stores the coded data; an index image generator which generates the index image by reducing the size of the selected original image; an encoder which intra-image codes the index image and compresses a data amount of the index image (here, "to intra-image code" is also called and meant as "intra-frame code"); a second data recorder which stores the coded index image in a manner such that the index image is associated with the original image; a second decoder which selects and decodes a predetermined index image along with progression of the moving images; and an index updating unit which controls to cause to update the decoded index image along with progression of the moving images.

Moreover, the apparatus may further include: an index area generator which generates an index display area constituted by using the index image so that a relationship in terms of time with the moving images can be recognized; and a display controller which controls to cause to arrange and display the moving images and the index display area on a same screen. Moreover, the first and second decoders may be combined to a single structure. Moreover, the index display area may be controlled to cause to be displayed on the moving images, as an OSD (On Screen Display). In such a case, it is preferred that the visibility by the viewer be taken into consideration.

When the moving images are recorded in the image recording-reproducing apparatus or the moving images recorded by the image recording-reproducing apparatus are reproduced, the index images are generated and coded in advance and then are recorded in the second data recorder. Then, when the moving images are reproduced, the index images are selected and decoded in accordance with the progression of the moving images. If the first and second decoders are combined into a single decoder, the index images are decoded utilizing an idling time period during which a processing for decoding the moving images is not performed.

The index image is recorded in a manner such that the index image is associated with a recoded address of a recoding medium that stores an image that is the original image of the index image, and the apparatus may further include a scene determining unit which selects an image to be displayed from the record address associated with the index image selected by the user, and which moves a display scene for the moving images to said image. MotionJPEG (Joint Photographic Coding Experts Group), MPEG-2 (Moving Picture Experts Group 2) and MPEG-4 may be used as methods of coding the moving images, but are not limited thereto. Moreover, as methods of compressing the index images, there are MPEG, JPEG, GIF (Graphics Interchange Format) and so forth.

Still another preferred embodiment according to the present invention relates also to apparatus for recoding and reproducing images. This apparatus includes: a first MPEG decoder which acquires coded data that are moving image signals coded in compliance with an MPEG standard, and which decodes unit images that constitute moving images; an image selector which selects an original image of an index image used in the search of a desired scene among the moving images, from the unit images decoded by the first MPEG decoder; a first data recorder which stores the coded data; an index image generator which generates an index image by reducing the size of the selected unit images; an MPEG encoder which intra-image codes the index image; a second data recorder which stores the coded index image in a manner such that the coded index image is associated with an original image thereof; a second MPEG decoder which decodes a predetermined index image; an index area generator which generates an index area constituted by using the decoded index image so that a relationship in terms of time with progression of the moving images can be recognized; and a display controller which controls to cause to display the index area.

Still another preferred embodiment according to the present invention relates to a television receiver. This television receiver includes: a tuner unit which receives television broadcast signal waves that has been subject to a predetermined modulation, and which demodulates the signal waves into transport streams in which moving image signals coded in compliance with an MPEG standard are multiplexed; a TS separator which separates coded data of the moving image signals from the transport streams; a first MPEG decoder which acquires the coded data and decodes unit images that constitute moving images; a first data recorder which stores the coded moving image signals; an image selector which selects an original image of an index image used in the search of a desired scene among the moving images, from the unit images decoded by the first MPEG decoder; an index image generator which generates an index image by reducing the size of the selected unit images; an MPEG encoder which intra-image codes the index image; a second data recorder which stores the coded index image in a manner such that the coded index image is associated with an original image thereof;
a second MPEG decoder which decodes a predetermined index image; an index area generator which generates an index area constituted by using the decoded index image so that a relationship in terms of time with progression of the moving images can be recognized; a display controller which controls to cause to display the index area; and a scene determining unit which, in the event that any of the index images constituting the index area is selected by a user, resumes progression of the moving images from an image associated with the selected index image.

Still another preferred embodiment according to the present invention relates also to a television receiver. This television receiver includes: a tuner unit which receives television broadcast signal waves that has been subject to a predetermined modulation, and which demodulates the signal waves into transport streams in which moving image signals coded in compliance with an MPEG standard are multiplexed; a TS separator which separates coded data of the moving image signals from the transport streams; a first MPEG decoder which acquires the coded data and decodes unit images that constitute moving images; a first data recorder which stores the transport streams; an image selector which selects an original image of an index image used in the search of a desired scene among the moving images, from the unit images decoded by the first MPEG decoder; an index image generator which generates an index image by reducing the size of the selected unit images; an MPEG encoder which intra-image codes the index image; a second data recorder which stores the coded index image in a manner such that the coded index image is associated with an original image thereof; a second MPEG decoder which decodes a predetermined index image; an index area generator which generates an index area constituted by using the decoded index image so that a relationship in terms of time with progression of the moving images can be recognized; a display controller which controls to cause to display the index area; and a scene determining unit which, in the event that any of the index images constituting the index area is selected by a user, resumes progression of the moving images from an image associated with the selected index image.

The assignee of the present invention has adopted the reverse reproduction technology proposed by Japanese Patent Application Laid-Open No. 2001-238167, and manufactured and marketed it as a single-chip LSI (Large-Scale Integration) circuit. This LSI is equipped with an MPEG-2 decoder capable of decoding 2-channel MPEG-2 streams and an MPEG encoder. The present invention can realize a low-cost production of apparatus as claimed, by utilizing this LSI.

It is to be noted that any arbitrary combination of the above-described structural components and expressions changed between a method, an apparatus, a system, a recording medium and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the following first to fifth embodiments which do not intend to limit the scope of the present invention but exemplify the invention. All of the features and the combinations thereof described in the embodiments are not necessarily essential to the invention.

In these preferred embodiments, when digital television broadcast recorded on a hard disk is reproduced, index images (hereinafter referred to also as "thumbnail images") which are reduced for use with the search are displayed in a time-series manner, so as to support a user in specifying a desired scene.

In general, when the user wants to see another scene in the same program during viewing the program recorded in the recording medium such as a hard disk, the desired scene needs to be retrieved by once interrupting a reproduction process and then calling a picture displaying a thumbnail image.

Thus, in the preferred embodiments, moving images currently under reproduction is displayed and, at the same time, a plurality of thumbnail images are displayed on the same screen. Moreover, the thumbnail images displayed are switched at a predetermined timing according as the moving images progress. Hereinafter, the moving images being reproduced are called main images. Moreover, a region where the main image is displayed is called a main screen whereas a region where the plurality of thumbnail images are displayed is called a thumbnail frame. Under normal reproduction, the main images only are displayed, and the main images and the thumbnail frame are displayed on the same screen in accordance with a user's instruction.

If there is a scene in the thumbnail image that the user wishes to jump to, then the user selects the image by using interface means such as a remote controller (hereinafter abbreviated simply as "RC"). Thereafter, the decoding of images to be displayed on the main screen is resumed from a scene corresponding to the selected thumbnail image. If no desired scene exists, another thumbnail images are decoded, and a new thumbnail frame is generated and displayed.

Figure 1:
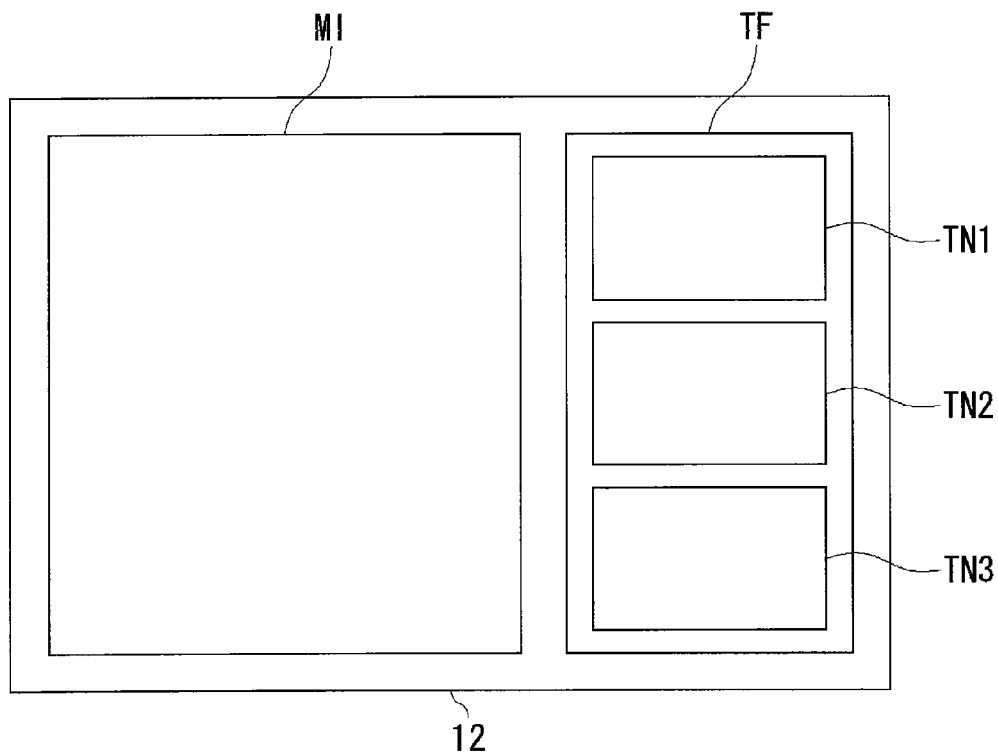
FIG. 1 shows an arrangement of a thumbnail frame and a main image in a display unit.

FIG. 1 shows a display unit 12 where a main image MI and a thumbnail frame TF that contains first to third thumbnail images TN1 to TN3 are arranged on a same screen. Here, the main image MI and the respective thumbnail images TN1 to TN3 are displayed in a manner such that the time-sequence relations therebetween are easily recognizable.

The first thumbnail image TN1 corresponds to a scene which is before the main image MI in time, whereas the second and third thumbnail images TN2 and TN3 correspond to scenes after the main image MI in time.

Figure 2:
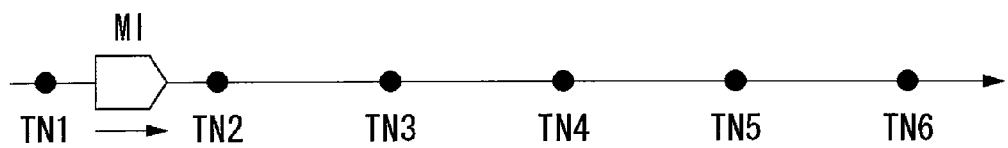
FIG. 2 shows a time-sequence relation between a main image and thumbnail images, where the time intervals between the thumbnail images are equal.
Figure 3:
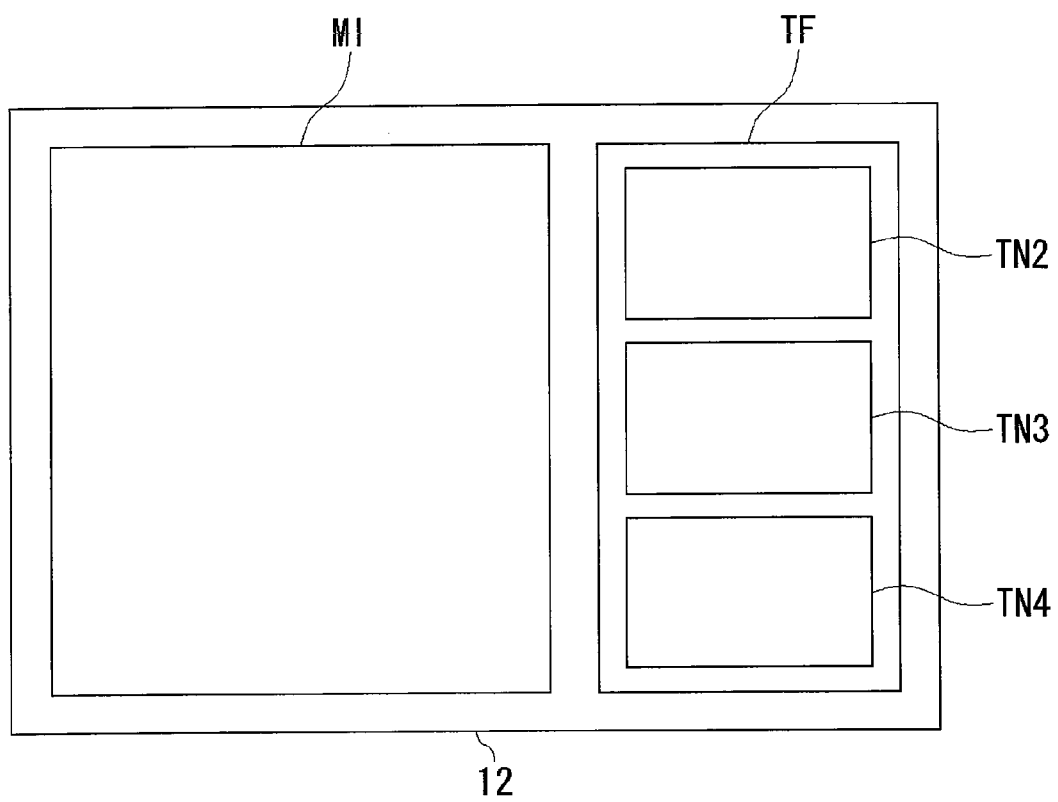
FIG. 3 shows an arrangement of a thumbnail frame and a main image in the display unit.

FIG. 2 shows the time-sequence relation between the main image MI and the first to sixth thumbnail images TN1 to TN6. In FIG. 1, for example, the main image MI is an image appearing in the sequence between the first thumbnail image TN1 and the second thumbnail image TN2. Thus, in this case, the first to third thumbnail images TN1 to TN3 are placed in the thumbnail frame TF. These thumbnail images will be updated and replaced by other thumbnail images according as the main image MI progresses. For example, when the main image MI reaches the second thumbnail image TN2 or it reaches to predetermined intervals, the first to third thumbnail images TN1 to TN3 are updated and respectively replaced by the second to fourth thumbnail images TN2 to TN4, as shown in FIG. 3.

Figure 4:
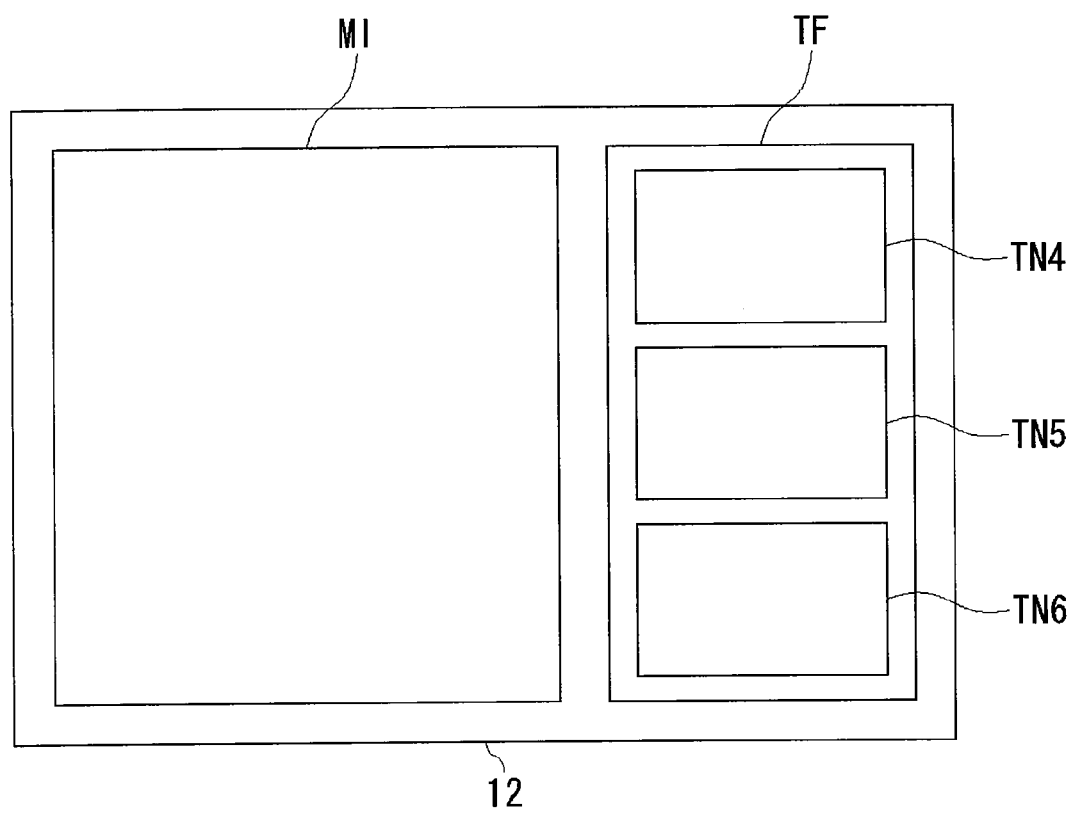
FIG. 4 shows an arrangement of a thumbnail frame and a main image in the display unit.

Moreover, according to the user's instruction, even if the main image MI corresponds to an image between the first thumbnail image TN1 and the second thumbnail image TN2, the fourth to sixth thumbnail images TN4 to TN6 may be placed in the thumbnail frame TF as shown in FIG. 4.

The following first to fifth embodiments are concrete examples to realize the above-described scene search. Here, the preferred embodiments are applied to, but not limited to, a receiving apparatus for digital television broadcast and a television receiver equipped with a hard disk capable of recording images.

First Embodiment

Figure 5:
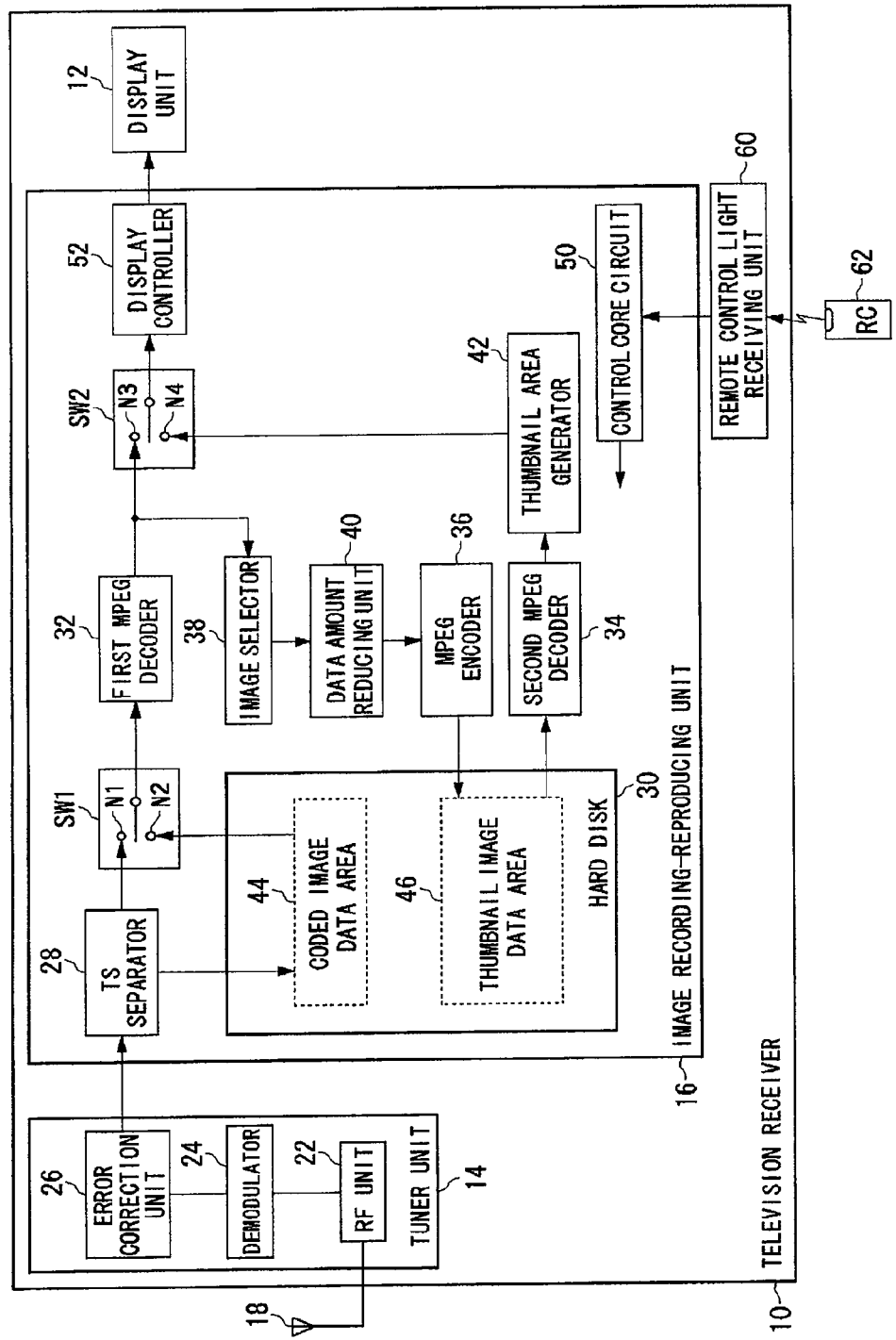
FIG. 5 is a block diagram showing a structure of a television receiver according to a first embodiment of the present invention

FIG. 5 is a block diagram showing a structure of a television receiver 10 according to a first embodiment of the present invention. The television receiver 10 is comprised of a display unit 12, a tuner unit 14, an image recording/reproducing unit 16 and a remote control light receiving unit 60. The remote control light receiving unit 60 receives instructions to the television receiver 10, which are given by the operation of the RC by a user. The instruction thus received is sent as a control signal to the respective component units of the television receiver 10 via a control core circuit 50 described later.

The tuner unit 14 includes an RF (Radio Frequency) unit 22 which converts RF signals received by an antenna 18 into base band signals, a demodulation unit 24 which demodulates the base band signals thus obtained, and an error correction unit 26. Signals outputted from the tuner unit 14 are called a transport stream (hereinafter abbreviated simply as "TS"), in which moving image signals, audio signals and all the data used in data broadcast are multiplexed according to the digital television broadcast specifications.

The image recording/reproducing unit 16 includes a TS separator 28, a hard disk 30, a first MPEG decoder 32, a second MPEG decoder 34, an MPEG encoder 36, an image selector 38, a data amount reducing unit 40 and a thumbnail area generator 42. Moreover, the image recording/reproducing unit 16 may be manufactured and sold as a separate unit per se, instead of being so structured that the image recording/reproducing unit 16 is contained in the television receiver 10.

The TS separator 28 separates the multiplexed signals into signals corresponding to the different kinds of information contained in the TS, such as moving image signals and audio signals. Since this embodiment specifically concerns and is characterized by moving image signals, the following description will cover moving image signals only, and description of signals other than moving image signals, such as audio signals, will be omitted here. The moving image signals and the audio signals separated by the TS separator 28 are coded image data and coded audio data encoded in the MPEG2 format, respectively. The coded image data separated in the separator 28 are sent to the hard disk 30 and a first switch circuit SW1.

The hard disk 30 includes a coded image data area 44, which stores coded image data, and a thumbnail image data area 46, which stores reduced images to be used as thumbnail images after the reduced images are subjected to an intra-image coding. The first MPEG decoder 32 and the second MPEG decoder 34 decode the image data encoded in the MPEG2 format.

The image selector 38 selects images to be used as thumbnail images from the decoded moving images. The image selection is made at predetermined intervals or at the timing when there exists a scene change.

When the selection timing is predetermined time intervals, the time intervals are selected in accordance with a state prior to recording or a state with prior to selecting thumbnail images. Concretely the time intervals are selected from, for example, the following four conditions:

(1) The time intervals are set according to a recording time period for one recording instance. For example, if the recording periods are 30 minutes and 120 minutes, then the time intervals therefore will be 5 minutes and 15 minutes, respectively. Thereby, the exactly enough amount of images utilized for the thumbnail images can be selected as search points.

(2) The time intervals are set according to the kind of a program to be recorded. For example, if a sport program is to be recorded, the time intervals will be set to 15 minutes whereas if a drama program is to be recorded, the time intervals will be set to 5 minutes. The development of the program may be rather slow depending on programs and, in such a case, shortening the time intervals for the thumbnail images may result in selecting the points where the corresponding thumbnail images are not so effective as search points, so that the processing itself might be wasteful. Thus, the images used as the thumbnail images can be selected at time intervals most suitable for the kind of a program to be recorded, by setting the time intervals in accordance with the kind of a program.

(3) The time intervals are set according to the remaining storage capacity of the hard disk 30. For example, if there is quite a room left for the storage capacity of the hard disk 30, the time intervals will be set to 1 minute. And as the storage capacity becomes scarce, the time intervals will be set to 2, 5 and 10 minutes, for example. Thereby, the capacity shortage of the hard disk 30 during recording can be prevented.

(4) The time intervals are set when a user reserves a recording. Thus, the time intervals at which the thumbnail images are acquired can be determined according to a user's preference.

The image selector 38 may utilize, as the timing for selecting images used for the thumbnail images from the moving images decoded by the first MPEG decoder 32, the thumbnail image acquisition points indicated by a program transmitting side that is a contents provider. For example, the thumbnail image acquisition point is the timing at which each section of the program is started or title background is inserted or the like. More appropriate scene search can be realized by collecting the search points that the program transmitting sides intentionally selected.

If the program is constituted by a plurality of chapters, the image selector 38 may utilize the top image of each chapter as the thumbnail image. And if an index image is prepared in each chapter, the image selector 38 may utilize the index image as the thumbnail image. Thus, the user can search for a desired scene while viewing the adjacent chapter image. Moreover, the user can search for the desired scene after the search is done in the chapter screen, so that such two-step operations can be realized simultaneously.

The user selects from the above-described conditions how the image selector 38 generates the thumbnail images at what timing, and the thus selected condition is set in the television receiver. The image selector 38 selects thumbnail images based on the condition set by the user.

The data amount reducing unit 40 converts the size of an image selected by the image selector 38 into a size adequate as a thumbnail image and thus reduces the data amount so as to generate a thumbnail image. At this time, not only the size but also the number of colors to be used may be reduced, for example, from 16 bits to 8 bits.

The MPEG encoder 36 performs a compression by intra-image coding on the thumbnail image which has been selected by the image selector 38 and whose data amount has been reduced by the data amount reducing unit 40. The compressed thumbnail image is recorded in the thumbnail image data area 46 together with the record address recorded in the coded image data area 44, as coded data prior to the decoding of the original image. Here, the image is coded and compressed by a compression technique using spatial frequency, or more specifically, in compliance with the I-pictures of the MPEG-2 standard. The thumbnail area generator 42 generates a thumbnail frame containing thumbnail images decoded by the second MPEG decoder 34.

The image recording/reproducing unit 16 further includes a first switch circuit SW1, a second switch circuit SW2, a control core circuit 50 and a display controller 52. The display controller 52 displays, together with the main screen, the thumbnail frame generated by the thumbnail area generator 42. At this time, the main screen is converted to an appropriate size in order to secure an area for display of the thumbnail frame on the display screen.

The control core circuit 50 controls the operation of the components of the image recording/reproducing unit 16, of which the principal components are the first MPEG decoder 32, the second MPEG decoder 34, the MPEG encoder 36, the thumbnail area generator 42 and the display controller 52. A typical example of the control core circuit 50 is a CPU (Central Processing Unit). Various control instruction programs are stored in advance in the hard disk 30, a ROM (Read Only Memory) or the like (not shown).

The first switch circuit SW1 switches input to the first MPEG decoder 32 according to the control by the control core circuit 50, thus switching the circuit to display either image data now being broadcast or image data recorded on the hard disk 30. At the point when connection on the first node N1 side is established, coded data which has been received by the tuner unit 14 and separated from the TS stream is sent to the first MPEG decoder 32. On the other hand, when connection on the second node N2 side is established, coded data is read out from the hard disk 30 and sent to the first MPEG decoder 32.

Similarly, the second switch circuit SW2 selectively sends moving images decoded by the first MPEG decoder 32 and/or a thumbnail frame generated by the thumbnail area generator 42 to the display control unit 52 according to the control by the control core circuit 50. When connection of the third node N3 is established, moving images decoded by the first MPEG decoder 32 are sent to the display control unit 52, and when connection of the fourth node N4 side is established, a thumbnail frame is sent to the display control unit 52. Where the thumbnail frame is not displayed, connection is always established on the third node N3 side. Whenever a thumbnail frame display is requested by the user, connection of the fourth node N4 is established at every timing of updating the thumbnail frame.

Although not shown in the block diagram, the apparatus according to this embodiment further includes a memory that functions as work area for the processings of the components thereof.

Figure 6:
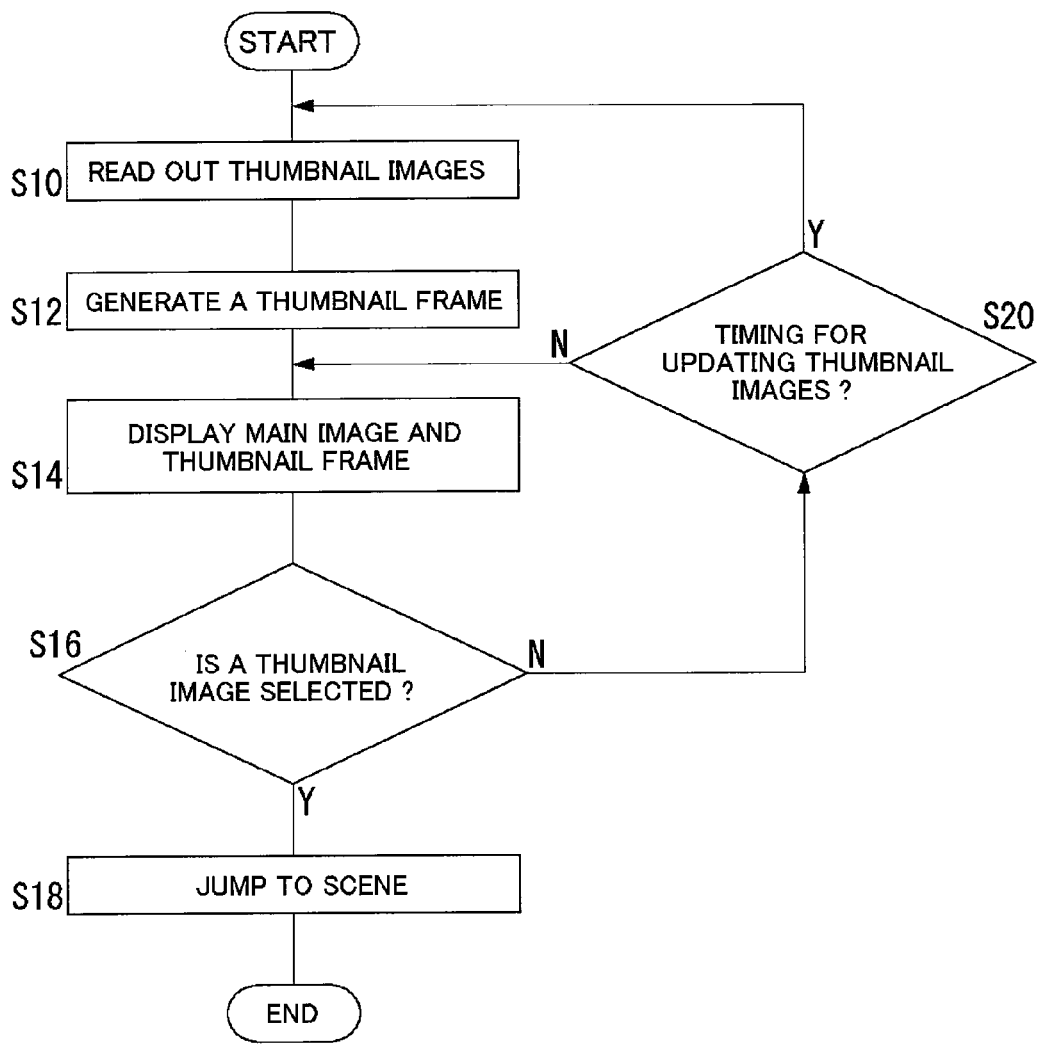
FIG. 6 is flowchart showing a procedure to display a thumbnail frame and jump to a desired scene.

Based on the above structure, a procedure of searching for a scene utilizing thumbnail images is illustrated in a flowchart of FIG. 6. Assume here that the thumbnail images displayed are arranged in the display unit, as shown in FIG. 1.

When the user selects the display of the thumbnail frame, the second MPEG decoder 34 reads out three thumbnail images corresponding to the main image, from the thumbnail image data area 46 and then decodes these three thumbnail images (S10). Then, based on the decoded thumbnail images, the thumbnail area generator 42 generates the thumbnail frame TF (S12). The thus generated thumbnail frame TF is displayed, in the display unit 12 together with the main images, by the display controller 52 (S14).

When any one of the displayed thumbnail images is selected by the user (Y of S16), the main image is jumped to a scene associated with the selected thumbnail image (S18), and the display of the thumbnail images is terminated. On the other hand, when no thumbnail image is selected by the user (N of S16), the procedure is returned to the step S14 and the display of the thumbnail frame continues if it is not a timing for updating images (N of S20). If it is an image update timing (Y of S20), the procedure is returned to the step S10 and thumbnail images are newly read out and, thereafter, the same processing will be performed.

According to the first embodiment described above, the user can search for desired scenes without interrupting the display of currently displayed moving images.

Second Embodiment

In the first embodiment, the thumbnail images are generated at predetermined intervals or when there is a scene change. In contrast thereto, the thumbnail images are generated based on a user's instruction, in this second embodiment. The thumbnail images are displayed and the scene is searched in the similar manner described in the first embodiment.

Figure 7:
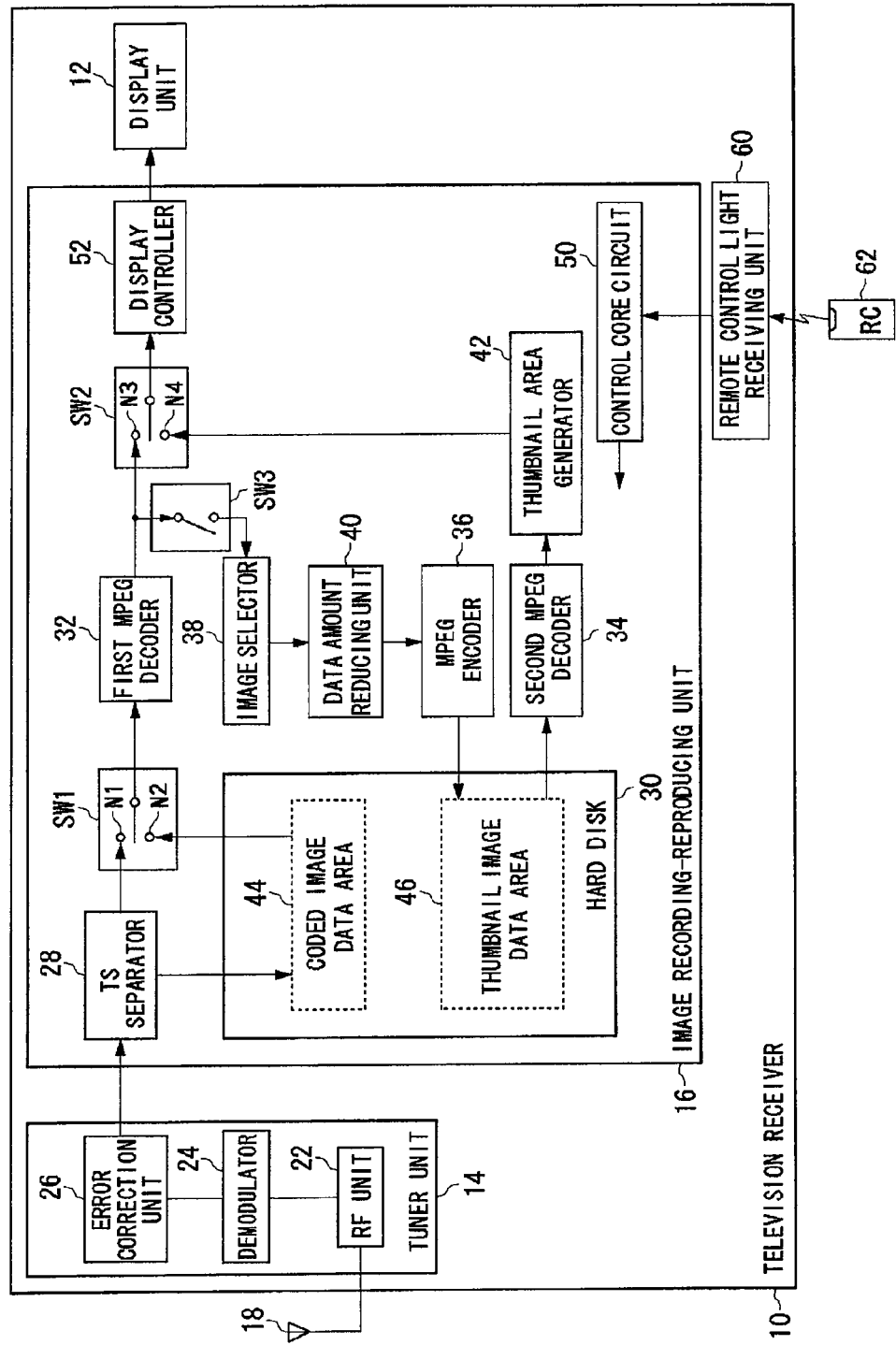
FIG. 7 is a block diagram showing a structure of a television receiver according to a second embodiment.

FIG. 7 is a block diagram showing a structure of a television receiver 10 according to a second embodiment. This structure shown in FIG. 7 is similar to one shown in FIG. 5, so that features especially characteristic in the second embodiment only will be described here, and the description of the other components will be omitted here.

According to the second embodiment, a third switch circuit SW3 is provided in a signal route between a first MPEG decoder 32 and an image selector 38. While confirming the main image, the user instructs, via the RC 62, timing at which the thumbnail images are to be generated.

Upon receipt of the user's instruction, the third switch circuit SW3 turns on and the image selector 38 selects an original image of the thumbnail image. Processings thereafter is similar to those described in the first embodiment.

By implementing the second embodiment, the same advantageous effects as in the first embodiment are obtained, and the scenes desired by the user can be recorded as thumbnail images.

Third Embodiment

In the first and second embodiments, the second MPEG decoder 34 is used for decoding the thumbnail images. In the third embodiment, the first MPEG decoder 32 and the second MPEG decoder 34 are combined into a single decoder.

Figure 8:
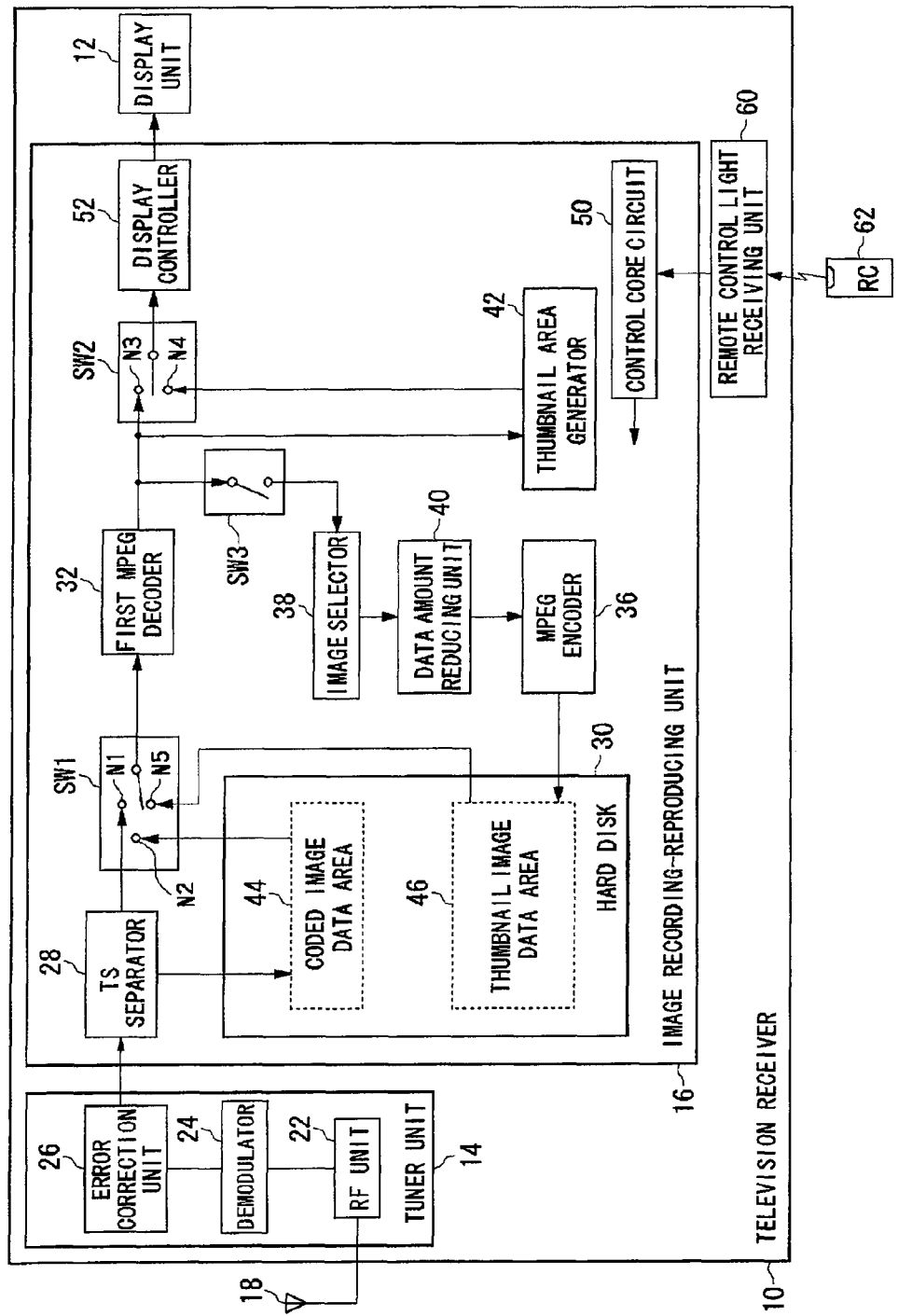
FIG. 8 is a block diagram showing a structure of a television receiver according to a third embodiment.

FIG. 8 is a block diagram showing a structure of a television receiver 10 according to a third embodiment. A structure according to the third embodiment is characterized by the feature that the second MPEG decoder 34 in the image recording/reproducing unit 16 is eliminated and that, as described above, the function of the second MPEG decoder 34 is performed by the first MPEG decoder 32. Thus, when the moving images and thumbnail images are decoded, namely, when the thumbnail images are generated in the thumbnail frame TF, those coded data are decoded in a time sharing manner.

Moreover, the first switch circuit SW 1 further includes a fifth node N5. When the moving images are displayed by decoding the coded image data recorded in the coded image data area 44 of the hard disk 30, connection is established in the second node N2 side of the first switch circuit SW1 and in the third node N3 side of the second switch circuit SW2, in accordance with a control by a control core circuit 50. Moreover, when the thumbnail images are decoded, the connection is simultaneously established in the fifth node N5 side of the first switch circuit SW1 and in the forth node N4 side of the second switch circuit SW2.

By implementing the third embodiment, the same advantageous effects as in the first and second embodiments are obtained, and the present invention in which any additional cost is minimized can be realized if the television receiver 10 is equipped with an MPEG decoder which can decode 2-channel MPEG2 streams.

Fourth Embodiment

In the first to third embodiments, data to be recorded on the hard disk 30 is coded data which has once been separated from the TS by the TS separator 28. In the fourth embodiment, however, TS is recorded as it is on the hard disk 30. The area where TS is recorded within the recording area of the hard disk 30 is called a TS data area 66, which corresponds to the coded image data area 44 in the first to third embodiments.

Figure 9:
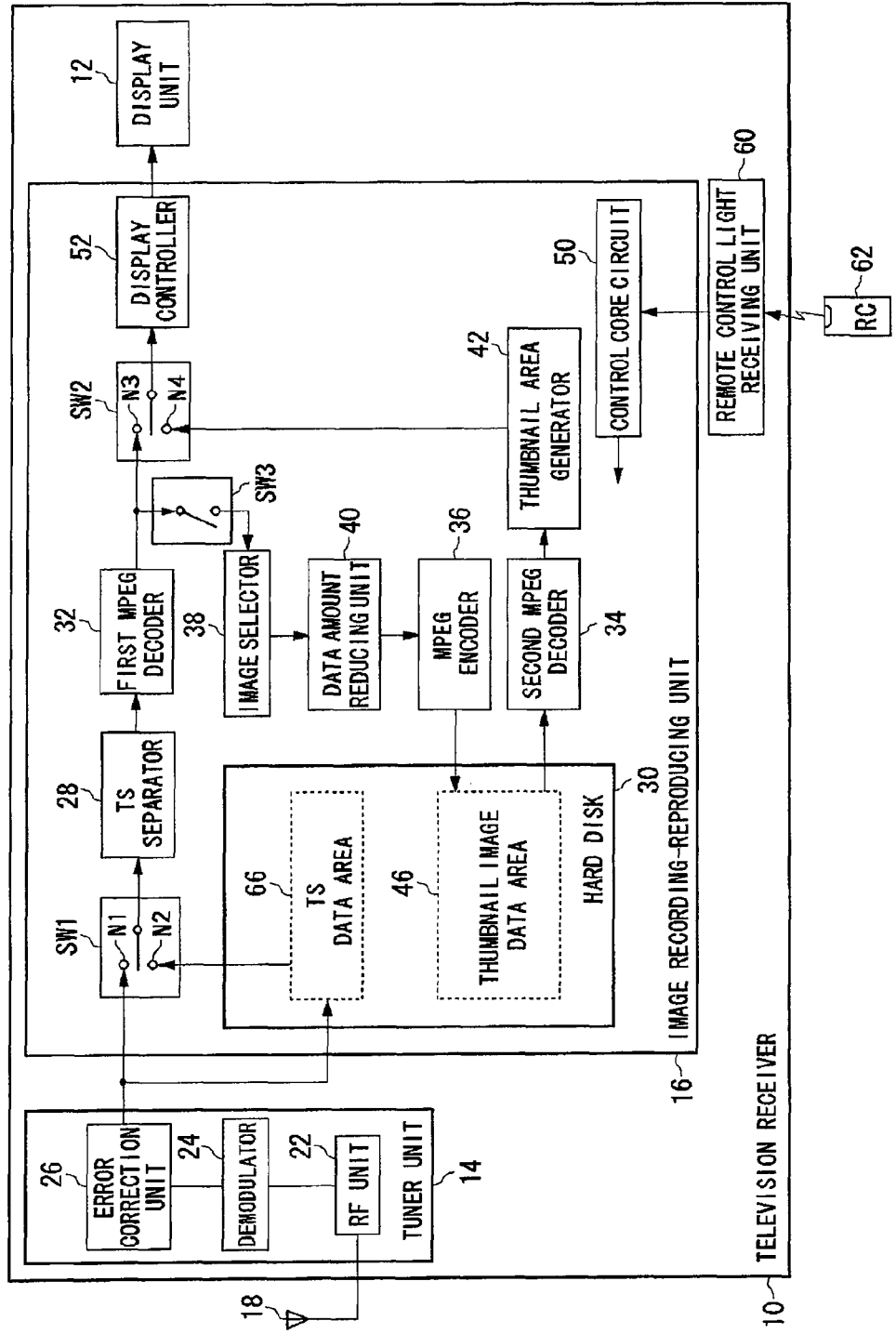
FIG. 9 is a block diagram showing a structure of a television receiver according to a fourth embodiment.

FIG. 9 is a block diagram showing a structure of a television receiver 10 according to a fourth embodiment of the present invention. Since the structure has much similarity to that of the television receiver 10 shown in the second embodiment, the points characteristic of the fourth embodiment only will be described hereinbelow.

The hard disk 30 is provided with the TS data area 66, where TS is recorded, in substitution for the coded image data area 44 where coded data separated from TS is recorded. Moreover, the first switch circuit SW1 is placed before the TS separator 28, that is, on the side of the tuner unit 14. By the operation of this first switch circuit SW1, either of the TS being received by the tuner unit 14 and the TS recorded in the TS data area 66 is selected and sent to the TS separator 28.

In the fourth embodiment, TS is recorded in the TS data area 66 of the hard disk 30 as a modification of the structure of the second embodiment. It goes without saying that the structure of the first and the third embodiment may be so changed as to allow the recording of TS in the TS data area 66 of the hard disk 30.

Fifth Embodiment

In the first embodiment, the timing for generating the thumbnail images is obtained by, for example, referring to images decoded by the first MPEG decoder 32. In this fifth embodiment, the timing for generating the thumbnail images is a point where audio data changes greatly or abruptly.

Figure 13:
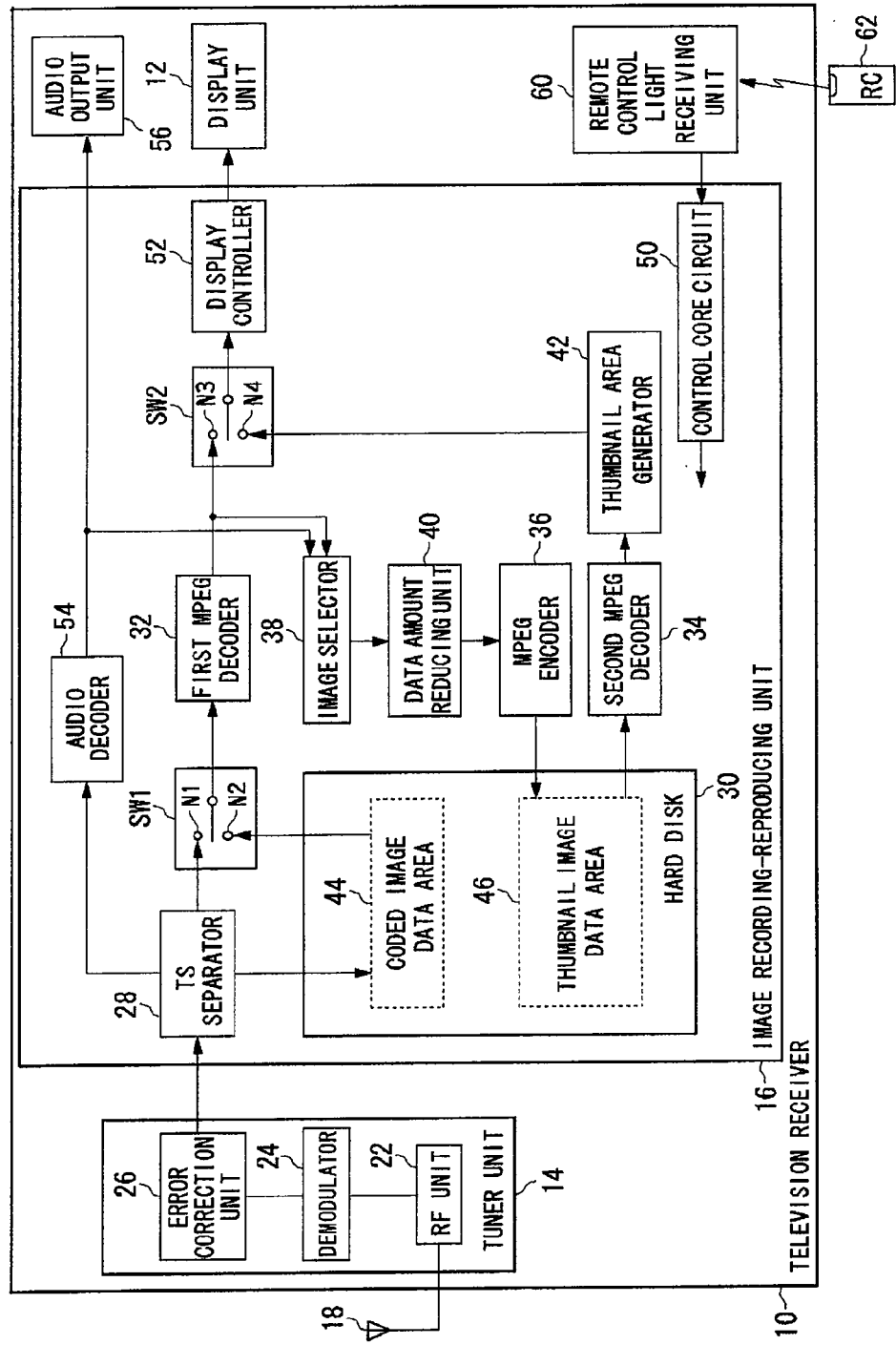
FIG. 13 is a block diagram showing a structure of a television receiver according to a fifth embodiment.

FIG. 13 is a block diagram showing a structure of a television receiver 10 according to a fifth embodiment of the present invention. Since this structure has much similarity to that of the television receiver 10 shown in the first embodiment, the points characteristic of the fifth embodiment only will be described hereunder.

A television receiver 10 includes an audio decoder 54 which decodes coded audio data separated by the TS separator 28 and an audio output unit 56 which outputs the decoded audio data to an external unit. If the audio data are coded in compliance with the MPEG-2 standard and the processing capacity of a first MPEG decoder 32 is large, the first MPEG decoder 32 may serve the function of the audio decoder 54. It is to be noted here that the audio decoder 54 and the audio output unit 56 are originally provided in the television receiver 10 according to the first to fourth embodiments, however, these elements 54 and 56 are omitted then for the sake of ease of explanation.

The audio data decoded by the audio decoder 54 are sent to an image selector 38 and the audio output unit 56. The image selector 38 refers to the audio data and determines, as timing for selecting the thumbnail images, a point at which the audio data changes greatly or abruptly. Based on the timing thus determined, the image selector 38 selects images to be utilized as thumbnail images, from the moving images decoded by the first MPEG decoder 32. The structure of the fifth embodiment may be so changed as to allow the recording of TS in the TS data area 66 of the hard disk 30 as the fourth embodiment.

In terms of hardware, the above-described structure can be realized by a CPU, a memory and other LSIs of an arbitrary computer. In terms of software, it is realized by memory-loaded programs having image-processing functions or the like, but drawn and described here are function blocks that are realized in cooperation with those. Thus, it is understood by those skilled in the art that these functional blocks can be realized in a variety of forms by hardware only, software only or the combination thereof.

The present invention has been described based on the embodiments which are only exemplary. It is understood by those skilled in the art that there exist other various modifications to the combination of each component and process described above and that such modifications are encompassed by the scope of the present invention.

In the present embodiments, time intervals for the thumbnail images are equal to one another. However, the time intervals may be enlarged as thumbnail images are away from the main image MI in time, as shown in FIG. 10.

Figure 10:
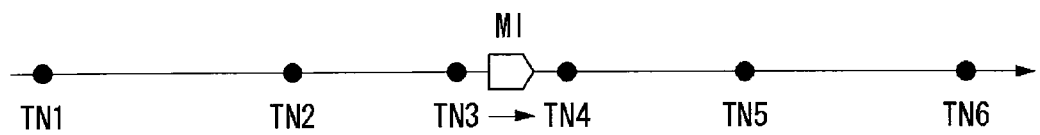
FIG. 10 shows time-series relationship between a main image and thumbnail images in a case when time intervals between the thumbnail images increase as the thumbnail images are located far from the man image in time.

FIG. 10 shows time-series relationship between the main image MI and the first to sixth thumbnail images (TN1 to TN6). The main image MI is placed between the third thumbnail image TN3 and the fourth thumbnail image TN4. The first to third thumbnail images TN1 to TN3 correspond to scenes appearing prior to the main image MI whereas the fourth to sixth thumbnail images TN4 to TN6 corresponds to scenes appearing after the main image MI.

Figure 11:
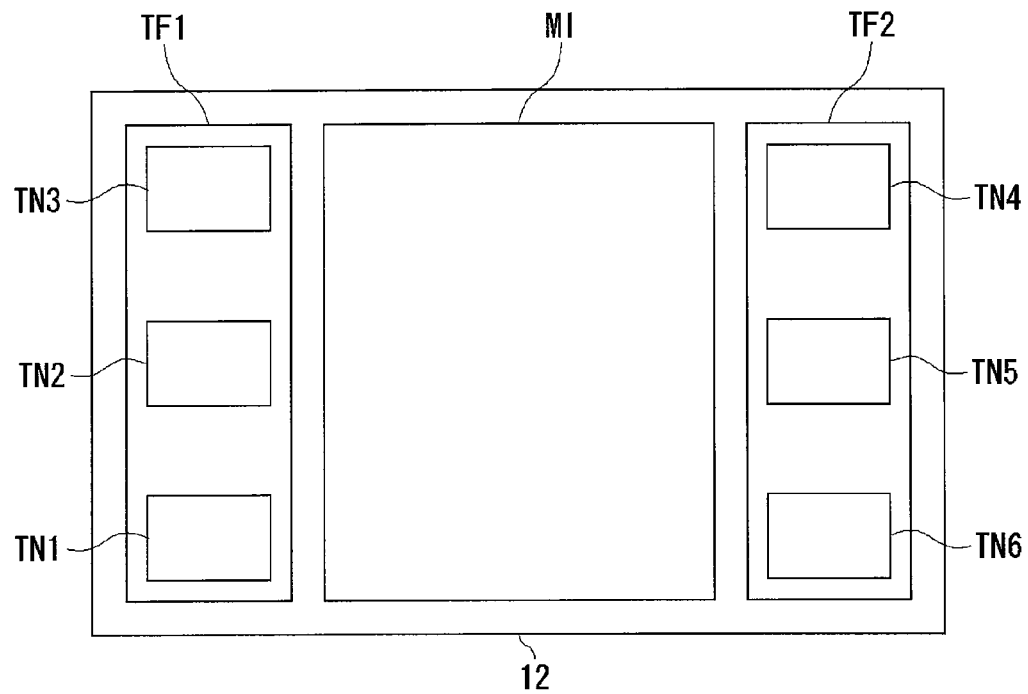
FIG. 11 shows, as a modified example, the placement of a main image and thumbnail images in a display unit.

FIG. 11 shows placement of the main image MI and the first to sixth thumbnails images TN1 to TN6 in the display unit 12. A first thumbnail frame TF1 contains the first to third thumbnail images TN1 to TN3 whereas a second thumbnail frame TF2 contains the fourth to sixth thumbnail images TN4 to TN6. With the main image MI placed in the middle, the first thumbnail frame TF1 is placed to the left of the main image MI, and the second thumbnail frame TF2 is placed to the right of the main image MI, so that the temporal relation between the main image MI and six thumbnail images is easily recognizable.

Figure 12:
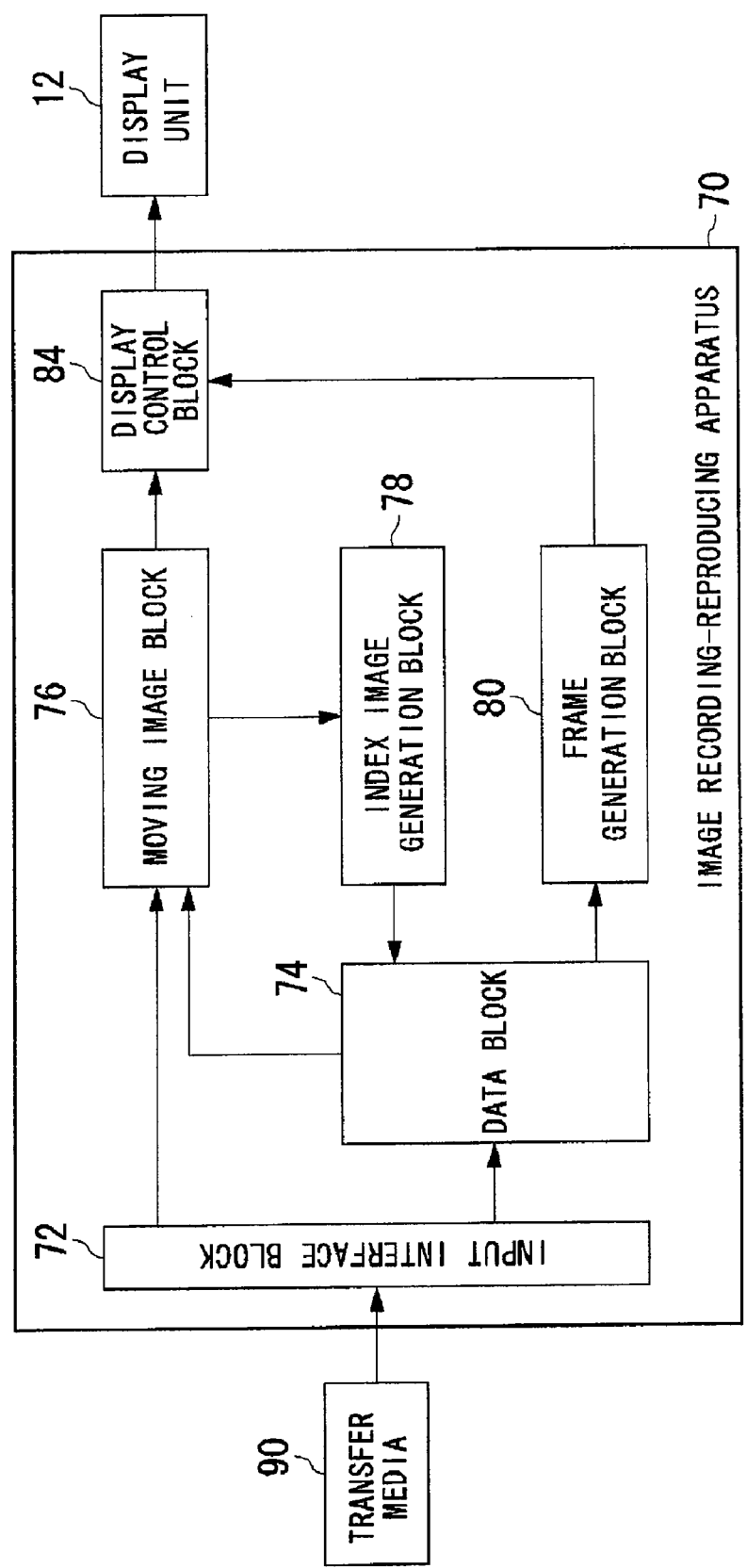
FIG. 12 is a functional block diagram showing a structure of an image recording/reproducing apparatus.

FIG. 12 shows a structure of the function blocks of an image recording/reproducing apparatus 70 of the present invention considered from a different point of view. The image recording/reproducing apparatus 70 is comprised of an input interface block 72, a data block 74, a moving image block 76, an index image generation block 78, a frame generation block 80 and a display control block 84.

Hereinbelow, a description is given of the principal correspondence between the components of the image recording/reproducing unit 16 described in the first to fifth embodiments and those of the image recording/reproducing apparatus 70 shown in FIG. 12. The moving image block 76 corresponds to the first MPEG decoder 32, and the data block 74 corresponds to the hard disk 30. The index image generation block 78 corresponds to the image selector 38, the data amount reducing unit 40 and the MPEG encoder 36. The frame generation block 80 corresponds to the second MPEG decoder 34 and the thumbnail area generator 42, and the display control block 84 corresponds to the display controller 52 and the second switch circuit SW2. It is to be noted that, though not shown in FIG. 12, the component blocks perform their respective functions jointly with a predetermined control circuit, such as a CPU, which corresponds to the control core circuit 50. Moreover, in a similar manner, the component blocks thereof perform their functions in linkage with one another.

The input interface block 72 receives coded data from a transfer medium 90. The coded data is either sent to the moving image block 76 or recorded in the data block 74. The index image generation block 78 selects images to be used as thumbnail images, from the moving images decoded by the moving image block 76, generates and codes thumbnail images and records the thus coded thumbnail images in the data block 74.

The frame generation block 80 decodes a plurality of predetermined thumbnail images and generates a thumbnail frame in such a manner that the temporal relationship of the thumbnail images with moving images is recognizable. The generated thumbnail frame is displayed independently or together with moving images on the display unit 12 by the operation of the display control block 84. Moreover, the frame generation block 80 updates the thumbnail frame at predetermined update timing. It is to be noted here that the transfer media 90 may be a storage medium such as DVD, or a broadcast medium such as ground wave, satellite broadcast or CATV.

Although the present invention has been described by way of exemplary embodiments, it should be understood that many changes and substitutions may further be made by those skilled in the art without departing from the scope of the present invention which is defined by the appended claims.

What is claimed is:

1. An image processing apparatus, including:
a processing unit which reads, from a recording medium storing a control instruction program and a plurality of reduced images, the control instruction program and the plurality of reduced images, wherein
the processing unit comprises:
a display controller which display, at the time of displaying moving images, the plurality of reduced images on a same screen displaying the moving images, in a manner such that a temporal relation of the reduced images to progression of the moving images is recognizable; and
a reduced-image updating unit which updates the displayed reduced images according to the progression of the moving images, wherein
the display controller display, on the same screen, a larger number of reduced images corresponding to a scene after a current scene in the moving images in time than reduced images corresponding to a scene before the current scene.

2. An image processing apparatus, including:
a processing unit which reads, from a recording medium storing a control instruction program and a plurality of reduced images, the control instruction program and the plurality of reduced images, wherein
the processing unit comprises:
a display controller which displays, at the time of displaying moving images, the plurality of reduced images on a same screen displaying the moving images, in a manner such that a temporal relation of the reduced images to progression of the moving images is recognizable; and
a reduced-image updating unit which updates the displayed reduced images according to the progression of the moving images, wherein
the display controller displays the moving images in the central area of the screen, displays reduced images corresponding to a scene before a current scene in the moving images in time to the left of the central area, and displays reduced images corresponding to a scene after the current scene in time to the right of the central area.

3. An image processing apparatus, including:
a processing unit which reads, from a recording medium storing a control instruction program and a plurality of reduced images, the control instruction program and the plurality of reduced images, wherein
the processing unit comprises:
a display controller which displays, at the time of displaying moving images, the plurality of reduced images on a same screen displaying the moving images, in a manner such that a temporal relation of the reduced images to progression of the moving images is recognizable; and
a reduced-image updating unit which updates the displayed reduced images according to the progression of the moving images, wherein
the display controller displays the plurality of reduced images such that the intervals between the reduced images are increases as the images are away from a current scene in the moving images.

4. The image processing apparatus according to claim 1, wherein the recording medium is a hard disk or an optical disk.

* * * * *